(12) United States Patent
Wendt et al.

(10) Patent No.: US 12,719,575 B2
(45) Date of Patent: Aug. 25, 2026

(54) SMART OPTICAL WIRELESS COMMUNICATION SYSTEMS

(71) Applicant: SIGNIFY HOLDING B.V., Eindhoven (NL)

(72) Inventors: Matthias Wendt, Würselen (DE); Pieter Johannes Stobbelaar, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 223 days.

(21) Appl. No.: 18/728,926

(22) PCT Filed: Jan. 12, 2023

(86) PCT No.: PCT/EP2023/050622

§ 371 (c)(1),
(2) Date: Jul. 15, 2024

(87) PCT Pub. No.: WO2023/135199

PCT Pub. Date: Jul. 20, 2023

(65) Prior Publication Data

US 2025/0096893 A1 Mar. 20, 2025

(30) Foreign Application Priority Data

Jan. 17, 2022 (EP) .................................... 22151702

(51) Int. Cl.
*H04B 10/114* (2013.01)
*H04B 10/27* (2013.01)
*H04W 28/02* (2009.01)

(52) U.S. Cl.
CPC ......... *H04B 10/1149* (2013.01); *H04B 10/27* (2013.01); *H04W 28/0226* (2013.01)

(58) Field of Classification Search
CPC .................................................. H04B 10/1149
See application file for complete search history.

(56) References Cited

U.S. PATENT DOCUMENTS 8,023,444 B2 * 9/2011 Bowser ................. G06F 1/3209 455/343.5
9,699,722 B2 7/2017 Helvick et al.
(Continued)

FOREIGN PATENT DOCUMENTS

CN 109068358 A 12/2018
CN 109450534 A 3/2019
(Continued)

OTHER PUBLICATIONS

Kumar, Vishal, et al., "Strategic Sleeping of Visible Light Communication Access Point," 6th IEEE International Conference on Signal Processing, Computing and Control (ISPCC 2K21), Oct. 2021, Solan, India, 2021 (6 Pages).

*Primary Examiner* — Nathan M Cors

(57) ABSTRACT

A control system is provided for an optical wireless communications system comprising a plurality of optical communications access points, APs, (102) which have a combined field of view which defines a coverage area, wherein the APs are for communicating with end devices, EDs, (204) over a communications medium of an optical wireless local area network. At least one ED is movable through the coverage area and thereby is in communications range of different APs along a path through the coverage area. The controller obtains a topology of a movable area, wherein the movable area is defined by the physical space through which a movable ED may move. An AP is identified which has a movable ED in its field of view (210), and then a first sub-set of the APs is activated which are determined as possibly being next along the path through the movable area from the identified AP. A second subset of the APs are determined not to be next along the path through the movable area, and they are switched to a reduced power mode.

15 Claims, 5 Drawing Sheets

(56) References Cited

U.S. PATENT DOCUMENTS

| | | | | |
|---|---|---|---|---|
| 9,713,085 | B2 * | 7/2017 | Kotecha | H04W 24/02 |
| 9,948,394 | B1 * | 4/2018 | Bitra | H04B 10/079 |
| 9,990,019 | B2 | 6/2018 | Wendt | |
| 10,419,114 | B2 | 9/2019 | Kaag et al. | |
| 10,644,804 | B1 | 5/2020 | Obeed et al. | |
| 11,019,565 | B2 | 5/2021 | Henry et al. | |
| 2011/0069951 | A1 * | 3/2011 | Son | H04B 10/1143 398/17 |
| 2015/0382291 | A1 * | 12/2015 | Helvick | H04W 52/0206 370/311 |
| 2018/0246391 | A1 | 8/2018 | Sun et al. | |

FOREIGN PATENT DOCUMENTS

| | | | |
|---|---|---|---|
| CN | 113016152 | A | 6/2021 |
| GB | 2563281 | A | 12/2018 |
| WO | 2017081207 | A1 | 5/2017 |
| WO | 2020101155 | A1 | 5/2020 |
| WO | 2020120968 | A1 | 6/2020 |
| WO | 2021209352 | A1 | 10/2021 |

* cited by examiner

SMART OPTICAL WIRELESS COMMUNICATION SYSTEMS

CROSS-REFERENCE TO PRIOR APPLICATIONS

This application is the U.S. National Phase application under 35 U.S.C. § 371 of International Application No. PCT/EP2023/050622, filed on Jan. 12, 2023, which claims the benefit of European Patent Application No. 22151702.2, filed on Jan. 17, 2022. These applications are hereby incorporated by reference herein.

FIELD OF THE INVENTION

The invention relates to optical wireless communication (OWC) systems. In particular the invention relates to high bandwidth OWC access points switching between active and reduced power modes in order to optimize power consumption.

BACKGROUND OF THE INVENTION

Optical wireless communication (OWC) refers to techniques whereby information is communicated in the form of a signal embedded in light (including visible light or invisible light such as infrared light) emitted by a light source. Depending on the particular wavelengths used, such techniques may also be referred to as coded light, Light Fidelity (LiFi), visible light communication (VLC) or free-space optical communication (FSO). In this context: visible light may be light that has a wavelength in the range 380 nm to 740 nm; and infrared (IR) light may be light that has a wavelength in the range 740 nm to 1.5 mm. It is appreciated that there may be some overlap between these ranges.

OWC (and hence LiFi and VLC) use light as a media of communication, for replacing cable wire (wireline) communication.

International Patent Application WO2020/101155 Al discloses a method for supporting vehicle mobility in a VLC network. In accordance with one of the techniques proposed therein, prior to an occurrence of a handover process, a handover pre-notification is provided by a serving cell where a vehicle is located, to a target cell where the vehicle is moving towards. The pre-notification allows the target cell to prepare for an upcoming handover, including reserving resources for the handover, prior to the occurrence of the handover process. Also disclosed is a different technique, whereby when a vehicle travels along a street in such VLC network, streetlights located in front of a serving cell in the driving direction of the vehicle are added to a current serving cell, some serving streetlights located at the rear end of the serving cell are removed from the current serving cell. That is, as the vehicle travels, the serving cell is reconfigured.

Light based communication offers the ability for high data rate communication, for example even exceeding 10 Gbit/s, for devices having a line of sight between them. This for example applies to a set of communicating devices within an office environment.

Known LiFi products rely on a grid of optical access points mounted in the ceiling. The beams of these access points are wide enough (and thereby have a large field of view and/or coverage area) to create an overlap with the neighboring access points at the level of the desks beneath. The receiving devices in such a system are typically located at the desks or are being held by hand at a height close thereto.

For ease of installation, the grid of access points is for example aligned with the luminaire grid in the ceiling. Each access point in such an installation must reach (i.e. illuminate, in the case of visible light) several square meters and hence illuminates a significant conical area. Such installations may utilize illumination light for the downlink (to the end devices) and may use invisible light (e.g. infrared or ultraviolet) for the uplink (towards the access point) so as not to disturb mobile device users. Alternatively, both downlink and uplink may utilize invisible light thereby at least partially or fully disentangling the lighting and communication infrastructure.

To communicate with the access points, currently a dongle is connected to a user device such as a laptop or tablet. These dongles also emit a similar broad beam to be sure that at least one access point will receive the signal from the dongle.

Each access point comprises a modem connected to one or multiple optical transceivers. The end devices (e.g., laptop with dongle) connect to the access point via an optical link and they also comprise a modem connected to one or multiple transceivers.

The function of the modem is to handle the protocols (modulate and demodulate) for transmitting and receiving data over the visible or invisible light connection. The modem transmitter includes an optical frontend which transforms an electrical signal of the transmit data to an optical signal (for example using an LED) and the modem receiver transforms the optical signal to an electrical receive data signal (using a photodiode).

Industrial settings often include structures such as metal racks and/or machinery that can severely impede RF wave propagation. Modern production processes may therefore opt to make use of optical wireless communication, and these processes are often significantly automated. Dedicated machinery for different production steps populates the production floor. The production machines can for example be 3D printers or automated milling tools. On-demand manufacturing with, for example, 3D printing systems are expected to become increasingly used.

Autonomously moving transportation and handling machines supply the production machines with raw materials and extract the production goods after the production step has been finalized. The finalized product may be placed in a warehouse for inspection and shipping. Such production spaces may be mostly run without any attendance of people and can be controlled and monitored by a centralized control system.

The capabilities of the transportation machines (or robots) are steadily increasing. For example, not only are the machines able to find the correct path through the space but they are now also able to make a visual inspection or perform simple tests on the goods. Thus, the autonomously moving machinery also needs to be connected to the central control system.

In addition, modern industrial production spaces need to be flexible. Thus, when using an OWC system, everywhere in the production space should be able to connect to a least one access point thereby to ensure the ease of relocation of production equipment and dynamic assignment of aisles through the space. End devices (EDs, also known as end points (EPs), such as dongles may be mounted on stationary equipment as well as on mobile assets on the production floor.

However, the OWC power consumption for such extended industrial spaces is usually substantial due to the number of APs needed to cover all the space for seamless OWC connectivity. Thus, a new approach for seamless OWC connectivity is needed which reduces the overall power consumption.

SUMMARY OF THE INVENTION

The invention is defined by the claims.

An alternative approach is provided which provides seamless OWC coverage by managing when APs enter a reduced power mode, such as a stand-by state, in order to reduce the power consumption.

According to examples in accordance with an aspect of the invention, there is provided a control system for an optical wireless communications system comprising a plurality of optical communications access points, APs, which have a combined field of view which defines a coverage area, wherein the APs are for communicating with end devices, EDs, over a communications medium of an optical wireless local area network, wherein at least one ED is movable through the coverage area and thereby is in communications range of different APs along a path through the coverage area, wherein the control system is adapted to:

obtain a topology of a movable area, wherein the movable area is defined by the physical space through which a movable ED may move;

identify an AP which has a movable ED in its field of view;

activate a first sub-set of the APs which are determined as possibly being next along the path through the movable area from the identified AP; and set a second sub-set of the APs which are determined not to be next along the path through the movable area to a reduced power mode.

Preferably, there is provided a control system in a manufacturing system for an optical wireless communications system comprising a plurality of optical communications access points, APs, which have a combined field of view which defines a coverage area, wherein the APs are for communicating with end devices, EDs, over a communications medium of an optical wireless local area network, wherein at least one ED is movable through the coverage area and thereby is in communications range of different APs along a path through the coverage area, wherein the control system is adapted to:

obtain a topology of a movable area for the at least one movable ED, wherein the movable area is defined by the physical space through which the at least one movable ED may move;

identify an AP which has the at least one movable ED in its field of view;

activate a first sub-set of the APs which are determined as possibly being next along the path through the movable area from the identified AP; and set a second sub-set of the APs which are determined not to be next along the path through the movable area to a reduced power mode wherein each of the APs in the second sub-set of APs is set to one of at least two reduced power modes each defined by a different power consumption and/or activation time and wherein the choice of reduced power mode for any particular AP in the second sub-set is based on the distance between the particular AP and the movable ED and whether the field of view of the particular AP is in the movable area.

The activated APs implement handover of an ED as they move along a path. The reduced power is, for example, a standby mode for background communication whereas the activated APs are for a guaranteed quality of service connection.

This might be interesting in all kinds of OWC applications, but especially in industrial use cases the inventors found attractive opportunities to automate such a standby management system. During production processes there are frequently repeating activities allowing to build rules to enable power optimization.

The field of views (FOVs) of optical APs are typically much smaller than other RF-based APs (e.g. WiFi or Bluetooth) as they rely on visible light (or near visible light) which is stopped by objects. Additionally, smaller FOVs typically result in higher quality of service. Thus, an array of optical APs is typically used to ensure coverage over a large area. The combination of all the FOVs is referred to as the coverage area in this case.

The purpose of the optical APs is to enable the EDs to communicate wirelessly to a local area network. Some EDs may be static (i.e. non-moving) and can thus communicate with a single AP. However, when there is an ED moving through the coverage area, it will have to change which AP it is communicating with. In order to avoid latency when switching between APs, this would require all APs in a coverage area to be active such that any ED can move throughout the coverage area without any latency. In some situations, having all APs in a coverage area active even when only one of them is being used requires a lot more power usage than is strictly required. In other words, only one AP is needed at any time for one ED, but all of the APs have to be active to reduce latency.

It has therefore been proposed that only APs which are determined as possibly being next along the path of an ED are made active, whilst the rest of the APs can be set to a reduced power mode. This reduces the overall power usage on all APs as only the ones which may be needed next are activated (and therefore using a significant amount of power) whereas the rest are in a reduced power mode.

This enables an evaluation of the communication requirements for the various industrial process and analysis of the tradeoff between using the OWC system and using low quality of signal (QoS) RF communication.

Additionally, the topology of the space is taken into account. In most rooms, a movable ED will not be able to move completely freely. The room may have large stationary machinery, walls, furniture etc. which may impede how the movable ED can move. Thus, the control system can be given the topology of a so-called movable area. The movable area defines the space through which a movable ED can move and may include obstacles or objects which impede the movement of the ED in particular directions. The control system can therefore only activate APs for the purposes of communicating with a movable ED through which a path for the ED is physically possible. The movable area is a sub-set of the coverage area and it for example defines pathways within the topology of the coverage area.

Activating the first sub-set of APs may be performed by sending a wake-up trigger to at least the APs neighboring the identified AP. Thus, the first sub-set of APs are the neighboring APs which are triggered to activate based on the wake-up trigger. Alternatively, the first sub-set may be determined by checking which APs may possibly be next along the path and only sending a wake-up trigger to the APs possibly next along the path with FOVs covering the relevant movable area (i.e. movable area including the potential path(s)). The second sub-set may include all of the APs which are not in the first sub-set.

When there are a plurality of moving EDs in the coverage area, a first sub-set can be made for each of the moving EDs and the second sub-set may include all of the APs which are not in any of the first sub-sets.

APs can be powered down in different states typically defined by different amounts of power consumptions and/or activation times. For example, the TX current (transmit current) of the AP may be deactivated. For more aggressive power saving, all of the power to the AP may be turned off. An AP with a deactivated TX current may only take a relatively short time to active whilst the complete powering off of the AP may result in a larger delay to activate.

The choice of reduced power mode may depend on many aspects. However, two important aspects are that of the distance between the AP and the ED and whether the FOV of the AP is in the movable area. If the AP cannot be in the path of the ED (i.e. not in the movable area), then it is expected that the ED will not connect to the AP and therefore the AP can be set to a low reduced power mode (e.g. complete powering off). However, if the AP is relatively close to the ED, then it may be beneficial for it to be in a high reduced power mode (e.g. TX current deactivated).

Similarly, the distance between the AP and the ED affects the choice of reduced power mode. The distance may be determined from the distance between the AP identified as having the movable ED in its FOV and the AP in question. For example, the closer the ED is to the AP, the more likely it is to be activated soon. Thus, closer APs in the second sub-set may be set to a high reduced power mode (e.g. TX deactivated).

One of the reduced power modes may comprise a reduced transmitter current of a modem of the AP. Another one of the reduced power mode may comprise a deactivation of a modem of the AP.

Large energy savings may be achieved by switching APs who's coverage area does not overlap with the movable area of a movable ED to the off state. More subtle changes in power savings may (alternatively, or additionally) be achieved by considering the distance between the AP and the movable ED and switching the respective APs into one of multiple reduced power modes based on the physical distance. Physical distance may be measured for example as the Euclidean distance, or when considering the physical limitations imposed by the likes of machinery, walls, and furniture, the shortest path distance between the AP and the movable ED.

The control system may be adapted to store historical data relating to paths that have been followed by the EDs.

Thus, paths may be determined, and hence the rules for activation and standby, during normal system operation.

The control system may be further adapted to generate a probability map from the historic data relating to paths, wherein the probability map indicates the probabilities of the APs needing to be activated.

The probability map may be used to inform the control system which reduced power mode to set for the APs or even to set threshold power consumptions. The probability map may indicate a probability of activation over time. For example, if the probability of activation, in the next 30 seconds, for an AP in the second sub-set is over 10% (or 20%, 30%, 40%, 50% etc.), the AP may be set to a high reduced power mode (e.g. TX deactivated) or may even be changed to the first sub-set and pre-emptively activated. In fact, the choice of whether an AP is in the first sub-set or the second sub-set may be enhanced by the probability map.

The control system may be adapted to set different APs along the path to different settings corresponding to different data transmission requirements at different positions along the path.

The control system may be adapted to set the APs that are not in communication range of any of the paths that have been followed by any of the EDs to a static mode, wherein APs in the static mode are not activated or set to a reduced power mode when a movable ED is identified in the field of view of an AP.

In this way, APs as can be marked as <dynamic> if they ever have historically been connected to a moving ED. All others may then be marked as <static> and will not react to a wake-up triggered by a neighboring AP. After rearrangement of the coverage area, the control system can learn over time which APs only connect statically to non-moving EDs and which connect to moving EDs.

The APs in a static mode may be constantly activated if, for example, they are connected to a non-movable machine which needs connectivity. Alternatively, an AP in static mode may be set to a reduced power mode. The distinction between static and dynamic modes is that the APs in static modes do not react to activation or reduced power mode requests based on the movement of a movable ED.

The control system may be further adapted to determine whether the movable ED is in motion or stopped and set a threshold power consumption of the identified AP to a high threshold based on the movable ED being stopped.

The identified AP is the AP identified as having the movable ED in its FOV. The control system may determine whether an ED is in motion or stopped by checking the time the ED is connected to the identified AP. If the ED is connected to the identified AP for longer than a threshold time (e.g. 1, 2, 5, 10, 30 seconds etc.) then the control system can label the ED as stopped. For example, the ED may be interacting with another device. The particular threshold time may depend on the nature of the ED. For example, if the ED is a machine moving at a known maximum speed, the threshold time can be determined from the time it takes for the machine to cross the FOV of an AP.

The threshold power consumption is higher for a stopped ED than for a moving ED. In many situations, there is an assumption that when an ED is stopped, it is performing a function or doing something. For example, the ED may be checking the quality of a product before deciding where to move the product. The quality checking (or other actions) usually take place in a centralized system instead of locally by the ED and thus the bandwidth required by the ED when it is stopped is typically larger than when it is moving. Thus, the power requirements for the AP connected to a stopped ED are typically larger than for a moving ED.

The invention also provides an optical wireless communications system, comprising a set of optical access points, APs and the afore-mentioned control system.

The optical wireless communications system may further comprise one or more radio frequency based access points, RF APs, as a back-up connection to the local area network for the movable EDs.

The invention also provides a manufacturing system comprising:

- a set of processing units, wherein paths are defined between the processing units;
- a vehicle for delivering materials to the processing units and for taking away processed materials from the processing unit; and the afore-mentioned optical wireless communications system, wherein the vehicle is provided with an ED of the optical wireless communications system.

The manufacturing plant may comprise a plurality of the static objects and at least one automated guided vehicle which delivers materials to the static objects.

At least one processing unit may comprise a 3D printer or a milling machine.

The invention also provides a method of controlling an optical wireless communications system in a manufacturing system comprising a plurality of optical communications access points, APs, which have a combined field of view which defines a coverage area, wherein the APs are for communicating with end devices, EDs, over a communications medium of an optical wireless local area network, wherein at least one ED is movable through the coverage area and thereby is in communications range of different APs along a path through the coverage area, wherein the method comprises:

obtaining a topology of a movable area for the at least one movable ED, wherein the movable area is defined by the physical space through which the at least one movable ED may move;

identifying an AP which has the at least one movable ED in its field of view;

activating a first sub-set of the APs which are determined as possibly being next along the path through the movable area from the identified AP; and setting a second sub-set of the APs which are determined not to be next along the path through the movable area to a reduced power mode wherein each of the APs in the second sub-set of APs is set to one of at least two reduced power modes each defined by a different power consumption and/or activation time and wherein the choice of reduced power mode for any particular AP in the second sub-set dependent on:

the distance between the particular AP and the at least one movable ED and whether the field of view of the particular AP is in the movable area.

The method may further comprise storing historical data relating to paths that have been followed by the EDs.

The method may further comprise generating a probability map from the historic data relating to paths, wherein the probability map indicates the probabilities of the APs needing to be activated.

The invention also provides a computer program comprising computer program code which is adapted, when said program is run on a computer, to implement the aforementioned method.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
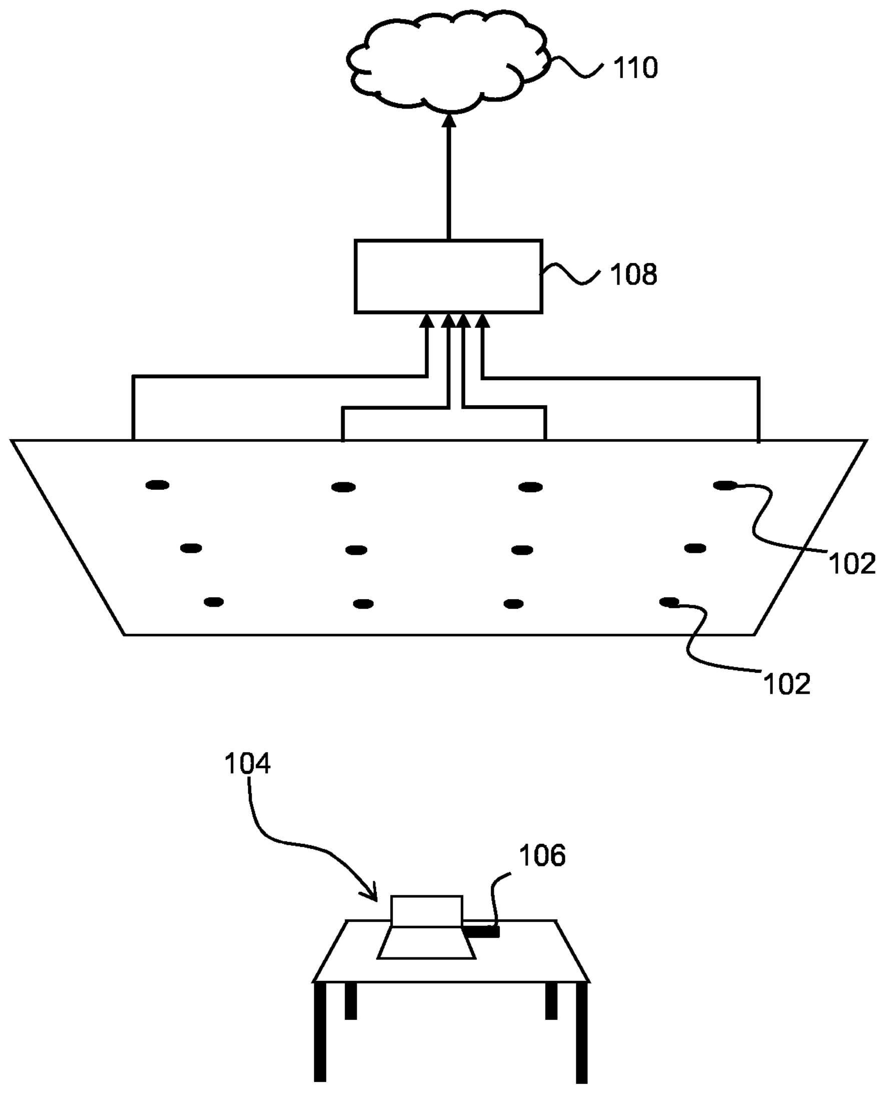
FIG. 1 shows a typical OWC system.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a control system for an optical wireless communications system comprising a plurality of optical communications access points, APs, which have a combined field of view which defines a coverage area, wherein the APs are for communicating with end devices, EDs, over a communications medium of an optical wireless local area network. At least one ED is movable through the coverage area and thereby is in communications range of different APs along a path through the coverage area. The control system obtains a topology of a movable area, wherein the movable area is defined by the physical space through which a movable ED may move. An AP is identified which has a movable ED in its field of view, and then a first sub-set of the APs is activated which are determined as possibly being next along the path through the movable area from the identified AP. A second sub-set of the APs are determined not to be next along the path through the movable area, and they are switched to a reduced power mode.

FIG. 1 shows a typical OWC system with a set of access points, AP, 102 forming a ceiling mounted infrastructure and an end device (also known as a station, STA) implemented by a dongle 106 attached to a mobile device such as a laptop 104. The combination of units 104 and 106 is the end device (also known as an end point). The access points are preferably linked to a backbone, e.g. by means of a wired link such as an Ethernet link using a twisted pair cable or an Optical Fiber network allowing the access points and/or a global system controller to align, e.g. on handover.

Each AP contains a modem connected to one or multiple LiFi transceivers. The end devices can connect to an AP via an optical link. Each end device also contains a modem connected to one or multiple LiFi transceivers. The function of the LiFi-modem is to handle the physical layer (PHY) and media access control layer (MAC) protocols for transmitting and receiving data over the visible or invisible light connection.

The LiFi transceiver comprises a transmitter to transform an electrical signal of the modem's transmit data to an optical signal (e.g. via an LED, a VCSEL or laser diode) and to provide a receiver to transform an optical signal to an electrical of the modem's receive data (e.g. via a photodiode). The end device is for example implemented by a dongle 106 attached to a mobile device such as a laptop. Instead of retrofitting, it is envisaged that the receiver functionality is ideally integrated with the user receiving devices themselves, in this manner laptops, tablets, mobile phones and/or other devices may use optical communication without the need for a dongle.

Connection to the network 110 is realized by means of the OWC system. In this case, the APs 102 may be integrated with luminaires or within the light fittings. The APs 102 are connected to the network 110 by means of a data transmission device and/or OWC control system 108. The number of APs 102 may determine the reliability of connection as well as the number of independent, interference free, connections in the space.

Figure 2:
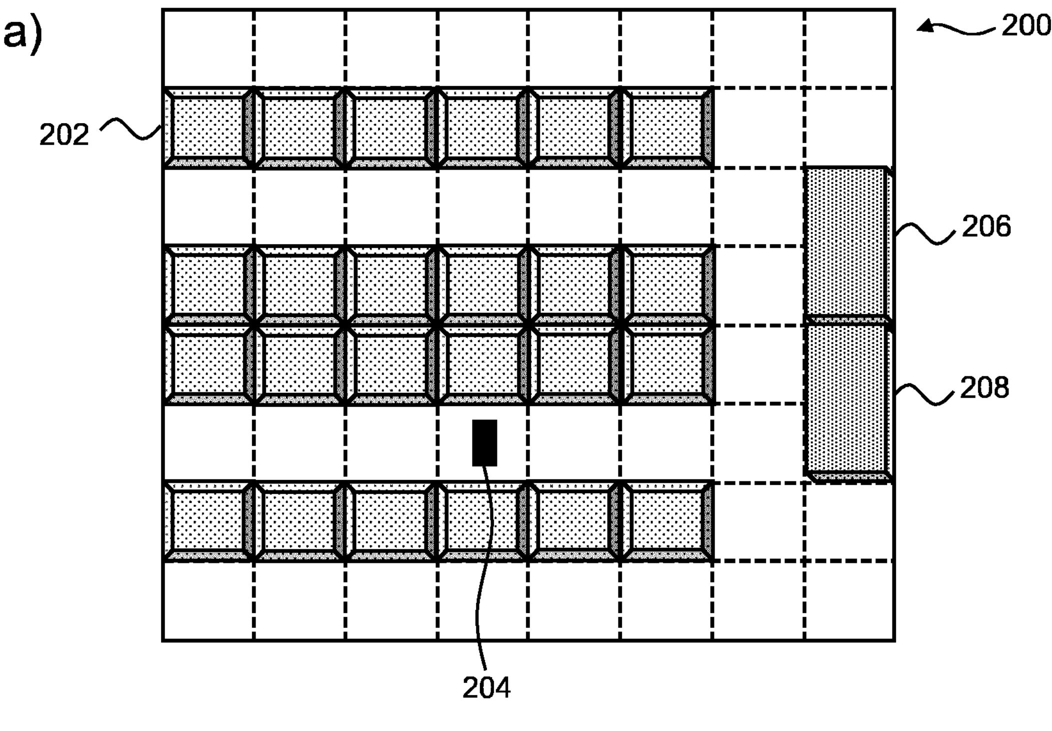
FIG. 2 shows a floorplan for an exemplary automated production floor.
Figure 2:
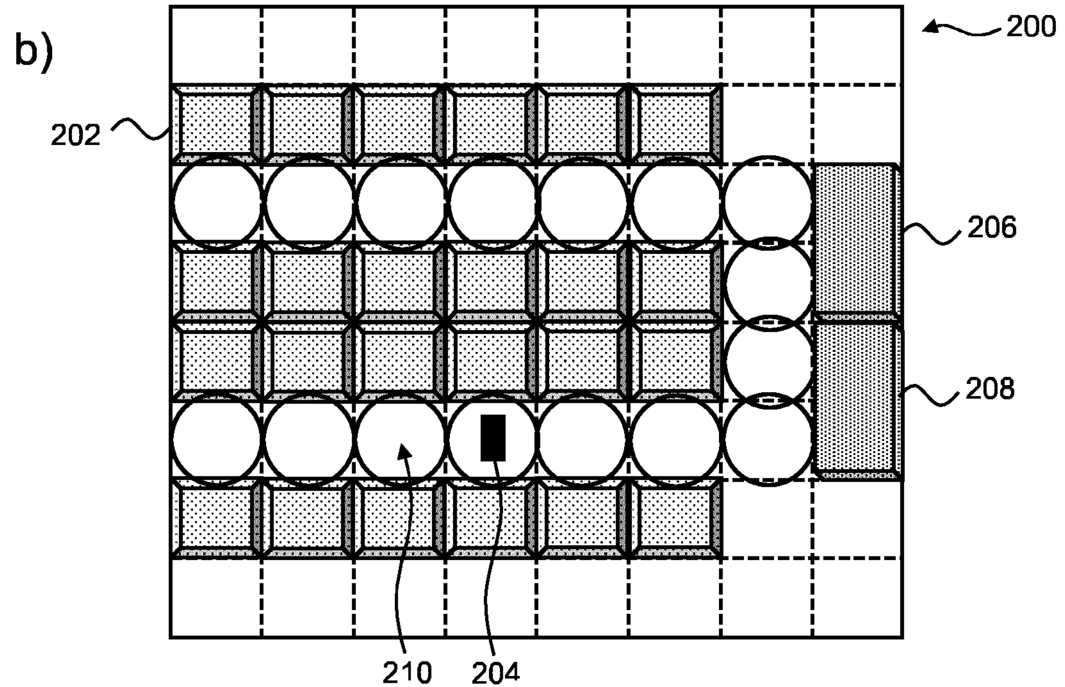

FIG. 1 shows a typical OWC system in an office setting. However, the OWC system can also be used in industrial settings, such as automated production floors, where the end devices EDs are, for example, production machines. FIG. 2 shows a floorplan for an exemplary automated production floor 200. Production machines 202 (e.g. 3D printers or automated milling tools) are laid out throughout the production floor 200 and may be used for different production steps. The production machines 202 are typically arranged in rows on the production floor 200 as shown in FIG. 2. Moving EDs 204 such as autonomously moving vehicles (e.g. automated guided vehicles AGVs) and handling machines, as well as service personnel, may be moving around the production floor. People and moving EDs 204 are typically restricted in their movements to dedicated separate corridors (aisles). The service people are not supposed to use the corridor for the moving vehicles.

FIG. 2 *a*) shows the production machines 202 placed in four rows on the floor 200. A moving ED 204 is taking raw material or prefabricated goods from one production machine 202 to the next after processing has been completed. There is also a warehouse which may include raw materials, intermediate storage, final products storage 206 and rejected parts storage 208.

OWC APs may be placed along the aisles of a production floor 200 and, in some cases, a plurality of APs may be used to cover all of the area of the production floor 200. FIG. 2 *b*) shows the field of view (FOV) 210 of an optical AP along the corridors of the floor. Only 16 FOVs 210 are shown along the corridor for clarity. However, it will be appreciated that all of the floor 200 may be covered by the FOVs 210 of the APs such that the production machines 202 are also connected and can be easily rearranged.

Additionally, a homogeneous field of RF communications (e.g. WiFi or Bluetooth) may be used on the floor 200 as a back-up communications system when the moving ED 204 or the machines 202 cannot connect to the OWC system. Thus, the OWC APs provide high quality of service (QOS) whilst the RF communications system provides back-up connectivity with a lower QoS. The OWC APs can typically transfer packets of data with guaranteed latency and data rate whilst RF communications may be prone to varying interferences and fading.

Figure 3:
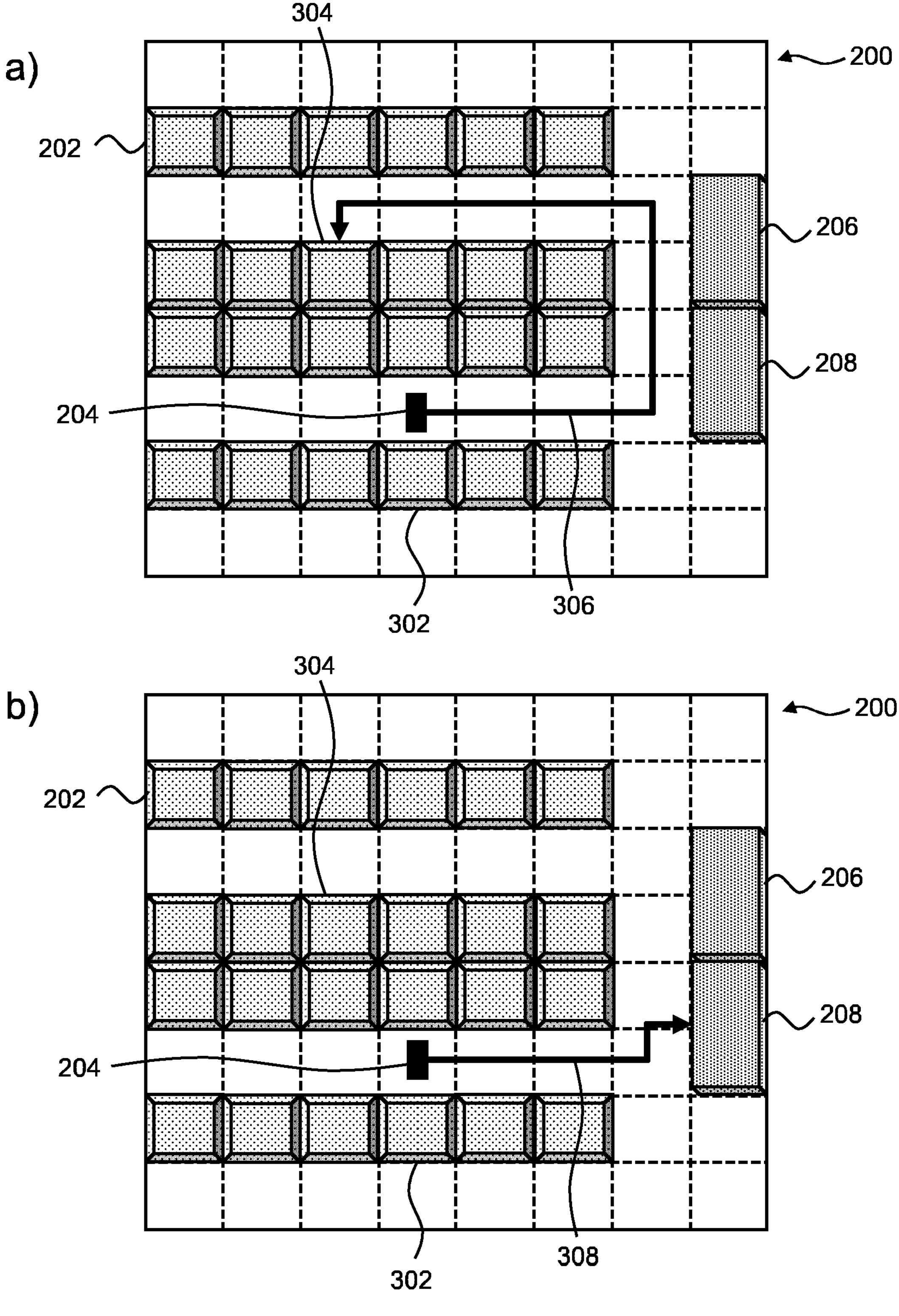
FIG. 3 shows the production floor with an exemplary path for a moving ED.

FIG. 3 shows the production floor 200 with an exemplary path for the moving ED 204. In the scenario depicted in FIG. 3 *a*), a product is being 3D printed at a first production machine 302. The moving ED 204 (e.g. a moving handling machine) takes the product out of the first production machine 302 when it signals that production is completed. On the way to a second production machine 304 (e.g. final painting process) the product may have to be visually checked by means of a video transmission from the moving ED 204 for analysis backend-processing in, for example, a server farm. At the path 306 from the first processing machine 302 to the second processing machine 304 the quality of the product is analyzed and it is determined whether the product is within the margins for further processing. If the product does not meet the quality requirements, it may be placed in the rejected parts storage 208.

FIG. 3 *b*) shows the path 308 taken by the moving ED 204 if it had to take the product to the rejected parts storage 208.

The beginning of paths 306 and 308 are identical and, thus, it would be preferable if the moving vehicle determined whether the product is of sufficient quality within the identical section of the paths 306 and 308. For this, APs need to be active along all of the path 306 in order to allow the end device (ED) in the moving vehicle to communicate with the network and seamlessly switch between APs along the path 306.

Figure 4:
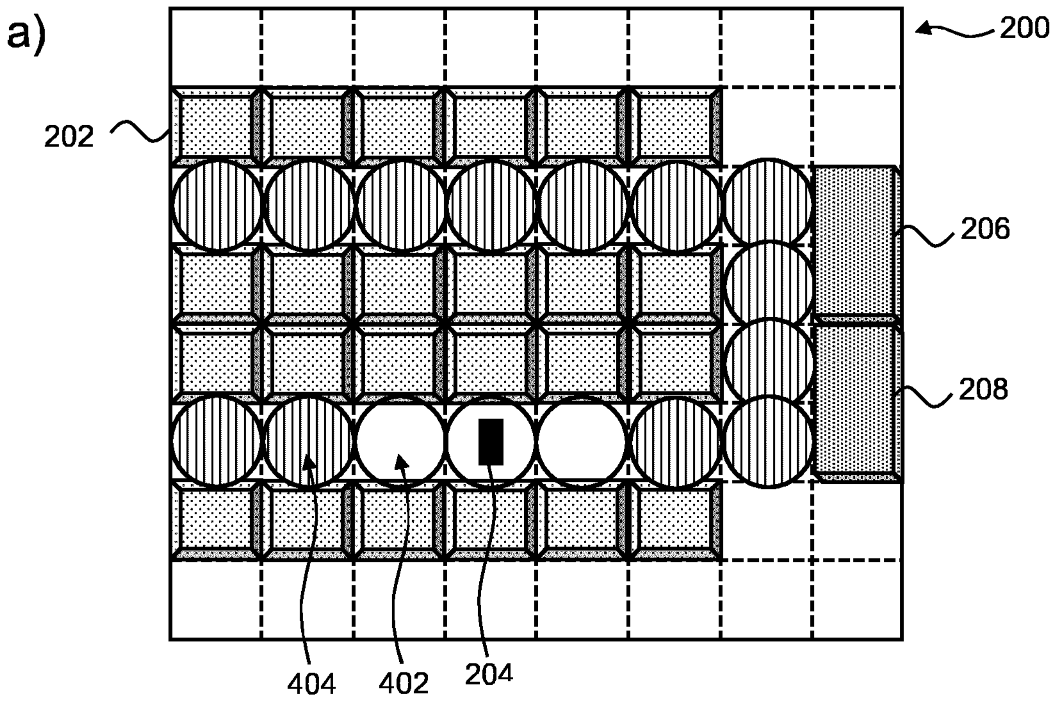
FIG. 4 shows the fields of view of the access points superimposed on the production floor.
Figure 4:
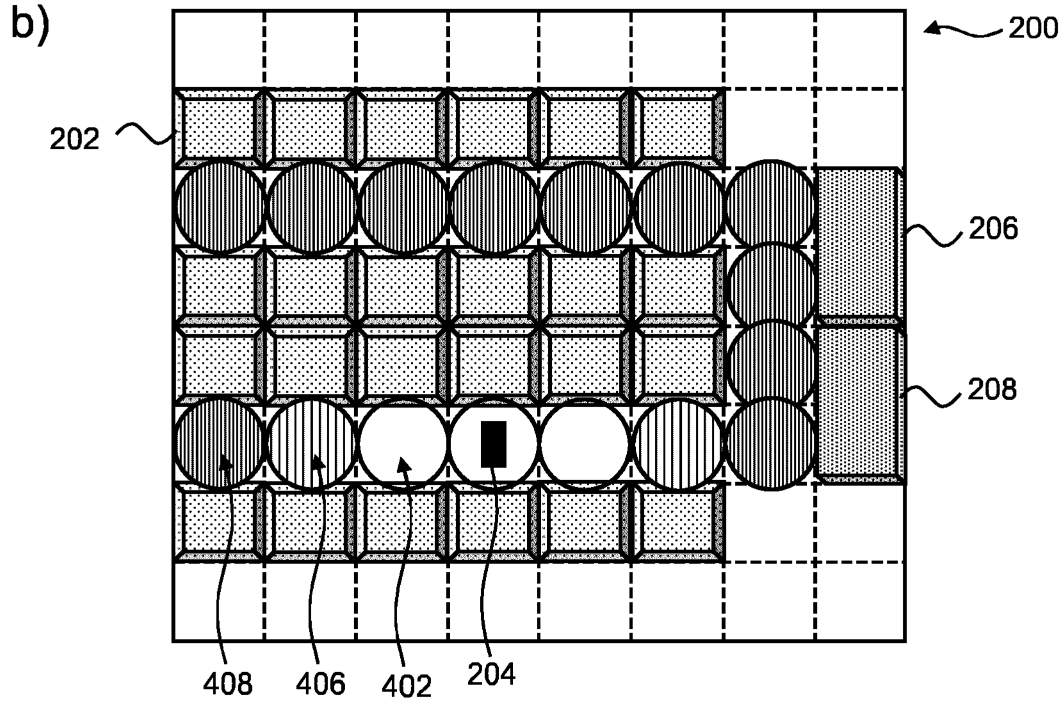

It is thus proposed to use the AP which is currently connected to the moving ED 204 to activate the surrounding APs. FIG. 4 shows the fields of view of the access points superimposed on the production floor 200. Blank FOVs 402 depict APs which are active whilst lined FOVs 404 depict APs which are in a reduced power mode. It becomes clear from the illustration in FIG. 4 *a*) that this may reduce the power consumption of the OWC system dramatically as it is no longer necessary to activate all APs under full power.

Neighborhood information between the APs can be determined from, for example, known coordinates of the APs so that they can directly contact the closest (neighboring) APs or using neighbor detection techniques.

Neighbor detection techniques include, for example, observing straylight reflected, diffracted, scattered and/or refracted at surfaces or objects which are illuminated by the light beams from a neighboring AP to monitor whether a channel is busy (occupied) by OWC transmissions of a neighboring transmitter.

It is further proposed to keep an RF connection always available and to deliver lower QoS (relative to the OWC APs) as, in this case, failures in connecting to a OWC AP in time would only lead to reduced performance but not to complete connection failures. It is therefore proposed to always have a back-up RF based connectivity available to allow for best power reductions by deactivation of as many APs as potentially possible. Additionally, if an AP is already connected to a maximum number of EDs (e.g. a G.hn OWC AP can maximally connect to 16 EDs) then the moving ED 204 can still connect to the back-up RF communication system. In other words, the back-up RF communications system ensures that when the moving ED 204 fails to connect to an AP, it can still connect to the network through the back-up RF communications system.

In some embodiments, there may be multiple states of reduced power modes and ways to wake nodes up. The FOVs shown in FIG. 4 *b*) show different reduced power modes. Blank FOVs 402 depict APs which are active, sparsely lined FOVs 406 depict APs which are in a first reduced power mode whilst densely lined FOVs 408 depict APs which are in a second reduced power mode, where the APs in the second reduced power mode consumes less power and/or takes longer to activate than the APs in the first reduced power mode.

In general, a first step in power reduction in OWC is deactivation of the TX current. Only a short delay will be necessary to run the current up to nominal bias level before transmissions is possible. More time delay will be caused by the deactivation of the complete optical frontend (OFE) as for instance the transimpedance amplifier (TIA) in the receive path (RX path) will need some time to stabilize after being powered up again. Finally, the whole modem may be deactivated together with the OFE which will give largest reduction in power consumption but also highest delay before availability can be guaranteed after a wake-up trigger. Many other reduced power modes will be envisaged which alter the time required for activation and power consumption in the reduced power mode.

The operational conditions for the OWC system may be optimized in several ways by, for example, implementing training modes. Training mode implementation can be considered as an optimization of the OWC system over time. Inputs for the training modes may include the dynamics of the system over time. In other words, there may be differences in optimization at different times based on a schedule (e.g. different data requirements at night compared to the repetitive processes during the day cycle).

Another input which may be considered for the training modes is the dynamics of the system over position. In other words, there may be different data requirements depending on the specific physical location in the system (i.e. hotspots for data/QoS). For example, the data traffic though each AP may be monitored and APs with high levels of data traffic and/or requirements for high QoS may, for example, not be set to a low reduced power mode.

Similarly, the same treatment may apply to APs in positions which are known to have large levels of data traffic and/or minimum requirements for QoS. This may occur when the moving ED 204 needs to perform a check for the products from a particular production machine 202. If the check is performed at the production machine, the AP corresponding to the position of the production machine 202 may be treated differently (e.g. not set to a low power mode) than other APs.

The dynamics due to movement of objects may also be used as inputs for the training modes. For example, the moving ED 204 may predominantly follow specific paths. The production of a particular product may follow one of various different paths (e.g. products that are rejected in the production line may require different processes than other products and thus may require different QoS).

The recording and analysis of the communication behavior between the moving EDs 204 and the APs may be done on a local server or be performed externally (e.g. on a cloud server).

All APs that are serving areas where no moving ED 204 can move can be left in a reduced power mode regardless of proximity to the moving ED 204. The area where moving EDs 204 can move is referred to as the movable area. Some production machines 202 may require connectivity and thus they may be activated separately. If the machines 202 do not need any OWC connectivity they can remain in a reduced power mode (e.g. deactivated) and hence only APs at positions where the moving ED 204 may move next need to be active and wait for handover request. A plan of the production floor 200 may be manually used to determine an AP's reach.

The movable area may be obtained via a floorplan detailing the position of static objects (e.g. machines, walls etc.). If the layout of the machines is changed, the floorplan may be updated. Alternatively, the movable area may be updated over time by checking the paths of the moving EDs 204. If the paths of the moving EDs no longer take them through a particular area, it may be because a machine has been moved to the particular area or a new machine has been put in that area. Thus, the particular area may be removed from the movable area, thus meaning that the AP for that particular area may no longer react or be sent wake-up triggers for nearby moving EDs.

When APs do not have their FOV in the movable area (e.g. they are not in the corridors) they can be marked as static APs. Thus, all APs can be labelled as "static" or "dynamic". APs marked as static may not react to wake-up calls (i.e. they will not be in the first sub-set of APs which are those determined as possibly being next along the path through the movable area) whilst the APs marked as dynamic will react to such wake-up calls.

The history of movements of the moving ED 204 around the production floor 200 can be registered and used to determine which APs to label as dynamic or static. This can be used to automatically mark all APs as dynamic if they ever got a connection to a moving ED 204. All others are marked static and will not react to a wake-up triggered by a neighbor AP. After rearrangement of the floor, the system can learn over time which APs only connect statically to non-moving EDs and which connect to moving EDs 204.

The probability that a certain neighbor AP will get the handover may be calculated from historic moves. For example, the moving ED 204 in FIG. 4 may have a higher probability of moving right towards the storages 206 or 208 than left towards the end of the corridor. Thus, the probability may be used to inform which APs are activated and, in some instances, may inform which reduced power mode to set for APs which are not activated. For example, the higher the activation probability for a particular AP, the higher the reduced power mode (i.e. higher power consumption/lower activation time). In situations where there are overlapping FOVs for the APs and the moving ED 204 has a choice of which AP to connect to, the probability may be used to choose the AP to connect to (e.g. if there is a higher probability to connect to the left APs, connect to the left-most available AP).

The probability may be made dependent on the movement direction. Thus, there may be different probabilities based on the direction in which the moving ED 204 is moving. For example, if the moving ED 204 starts moving from a first production machine towards a second production machine, the probability map may look different than if the moving ED 204 starts moving in the opposite direction towards the rejected part storage 208.

Additionally, the probability may be made dependent on information communicated by a process control system which is controlling the trajectory of every move of the moving ED 204. Using the information from the process control system, the speed of the moving ED 204 can be predicted, thus enabling the wake-up timing for an AP to be adjusted to fit the velocity of the moving ED 204 (i.e. the faster the moving ED 204, the sooner a wake-up message needs to be sent to activate the APs).

A machine learning algorithm could also be used to improve the performance of the OWC system. Starting from a situation with an AP which has a high QoS, hence high-power operation, a feedback loop using logged historical data demands may be input into the machine learning algorithm in order to optimize the QoS. This can be applied to a situation where an ED is used only temporarily in high QoS mode (e.g. to communicate visual inspection data). The remaining time, when the high QoS mode is not used, a lower power mode may be selected.

In summary, it is proposed to use an optimization for automatic standby activation of APs and recovery based on rules (i.e. APs next along the possible paths) determined during typical OWC system operations. This approach can be applied in all kinds of OWC applications but is especially advantageous in industrial use cases as they typically involve frequently repeating activities. The use of a back-up RF connection is further proposed for cases where untypical activities are detected as they may require an unplanned AP node reactivation which may take some time to activate.

Repeated movement sequences (i.e. common paths) may be found in the requirements profile in order to plan AP operation and standby mode schedule which leads to reduced power consumption.

Process triggers maybe selected (e.g. dynamic/static state, proximity to moving ED etc.) in order to start such activation/reduced power modes schedules for the regular production processes.

The ad hoc activation of the APs enables any deviations from schedule to be adaptively adjusted for varying sequences or timings.

Figure 5:
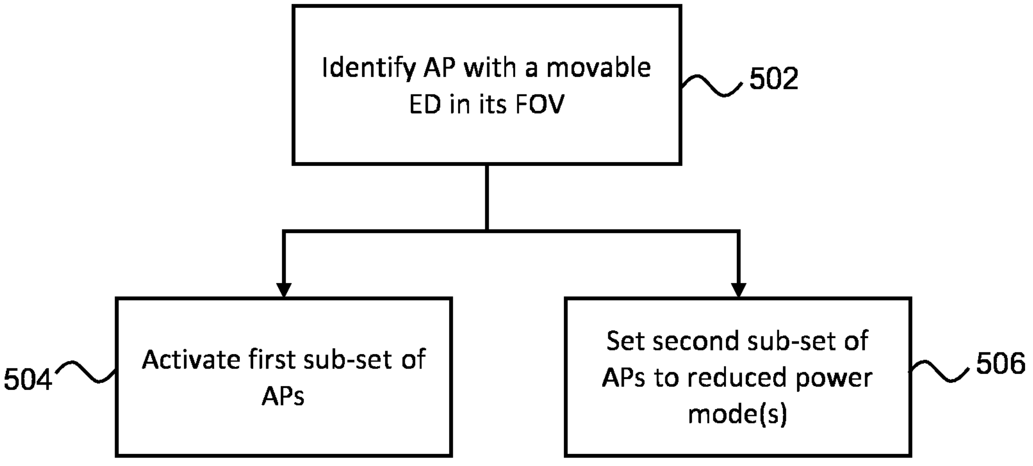
FIG. 5 shows a method of controlling an optical wireless communications system.

FIG. 5 shows a method of controlling an optical wireless (OWC) communications system. The OWC system comprises a plurality of optical communications access points, APs, which have a combined field of view which defines a coverage area. APs are for communicating with end devices, EDs, over a communications medium of an optical wireless local area network, wherein at least one ED is movable through the coverage area and thereby is in communications range of different APs along a path through the coverage area.

The method comprises identifying, in step 502, an AP which has a movable ED in its field of view. A first sub-set of the APs are activated, in step 504, which are determined as possibly being next along the path through the movable area from the identified AP. Additionally, a second sub-set of the APs are set to a reduced power mode, in step 506, which are determined not to be next along the path through the movable area.

The skilled person would be readily capable of developing a control system for carrying out any herein described method. Thus, each step of a flow chart may represent a different action performed by a control system and may be performed by a respective module of the processing control system.

The control system can be implemented in numerous ways, with software and/or hardware, to perform the various functions required. A processor is one example of a control system, which then often is referred to as a controller, which employs one or more microprocessors that may be programmed using software (e.g., microcode) to perform the required functions. A control system may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor or controller.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A control system for use in an optical wireless communications system in a manufacturing system comprising a plurality of optical communications access points, APs, which have a combined field of view which defines a coverage area, wherein the APs are for communicating with end devices, EDs, over a communications medium of an optical wireless local area network, wherein at least one ED is movable through the coverage area and thereby is in communications range of different APs along a path through the coverage area, wherein the control system is adapted to:

obtain a topology of a movable area for the at least one movable ED, wherein the movable area is a subset of the coverage area and defined by the physical space through which the at least one movable ED can move without stationary obstacles or objects that impede movement, the moveable area defining paths within the topology of the coverage area;

identify an AP which has the at least one movable ED in its field of view;

activate a first sub-set of the APs which are determined as possibly being next along the path through the movable area from the identified AP; and set a second sub-set of the APs which are determined not to be next along the path through the movable area to a reduced power mode;

wherein each of the APs in the second sub-set of APs is set to one of at least two reduced power modes each defined by a different power consumption and/or activation time and wherein the choice of reduced power mode for any particular AP in the second sub-set dependent on the distance between the particular AP and the at least one movable ED and whether the field of view of the particular AP is in the movable area.

2. The control system of claim 1, wherein the control system is adapted to store historical data relating to paths that have been followed by the EDs.

3. The control system of claim 2, wherein the control system is further adapted to generate a probability map from the historic data relating to the paths, wherein the probability map indicates the probabilities of the APs needing to be activated.

4. The control system of claim 2, wherein the control system is adapted to set different APs along the path to different settings corresponding to different data transmission requirements at different positions along the path.

5. The control system of claim 2, wherein the control system is adapted to set the APs that are not in communication range of any of the paths that have been followed by any of the Eds to a static mode, wherein APs in the static mode are not activated or set to a reduced power mode when a movable ED is identified in the field of view of an AP.

6. The control system of claim 1, wherein each AP comprises an optical front end having an optical transmitter and a modem connected to the optical front-end and wherein the at least two reduced power modes of a particular AP are selected from:

a first power down mode wherein the optical transmitter current of the optical transmitter is deactivated for the particular AP;

a second power down mode wherein the power to the optical frontend of the particular AP is deactivated; and a third power down mode wherein all power to the particular AP is deactivated.

7. The control system of claim 1, wherein the control system is further adapted to:

determine whether the movable ED is in motion or stopped; and set a threshold power consumption of the identified AP to a high threshold based on the movable ED being stopped.

8. An optical wireless communications system, comprising:

a set of access points, APs; and the control system of claim 1.

9. The optical wireless communications system of claim 8, further comprising one or more radio frequency based access points, RF APs, as a back-up connection to the local area network for the movable EDs.

10. A manufacturing system, comprising:

a set of processing units, wherein paths are defined between the processing units;

a vehicle for delivering materials to the processing units and for taking away processed materials from the processing units; and the optical wireless communications system of claim 9, wherein the vehicle is provided with an ED of the optical wireless communications system.

11. The manufacturing system of claim 10, wherein at least one processing unit comprises a 3D printer or a milling machine.

12. A method of controlling an optical wireless communications system in a manufacturing system comprising a plurality of optical communications access points, APs, which have a combined field of view which defines a coverage area, wherein the APs are for communicating with end devices, Eds, over a communications medium of an optical wireless local area network, wherein at least one ED is movable through the coverage area and thereby is in communications range of different APs along a path through the coverage area, wherein the method comprises:

obtaining a topology of a movable area for the at least one movable ED, wherein the movable area is a subset of the coverage area and defined by the physical space through which the at least one movable ED can move without stationary obstacles or objects that impede movement, the moveable area defining paths within the topology of the coverage area;

identifying an AP which has the at least one movable ED in its field of view;

activating a first sub-set of the APs which are determined as possibly being next along the path through the movable area from the identified AP; and setting a second sub-set of the APs which are determined not to be next along the path through the movable area to a reduced power mode;

wherein each of the APs in the second sub-set of APs is set to one of at least two reduced power modes each defined by a different power consumption and/or activation time and wherein the choice of reduced power mode for any particular AP in the second sub-set dependent on:

the distance between the particular AP and the at least one movable ED; and whether the field of view of the particular AP is in the movable area.

13. The method of claim 12, comprising storing historical data relating to paths that have been followed by the EDs.

14. The method of claim 13, further comprising generating a probability map from the historic data relating to paths, wherein the probability map indicates the probabilities of the APs needing to be activated.

15. A non-transitory computer readable medium comprising instructions which, when the instructions are executed by a processor of a computer, cause the computer to perform the method of claim 12.

* * * * *